May 27, 1958     A. C. WILSON     2,836,463
PROCESS FOR AIRCRAFT SPRAYING AND APPARATUS THEREFOR
Filed June 1, 1955     2 Sheets-Sheet 1

ARCHIE C. WILSON
*INVENTOR.*

BY *Halph McCaghun*
*atty*

May 27, 1958 A. C. WILSON 2,836,463
PROCESS FOR AIRCRAFT SPRAYING AND APPARATUS THEREFOR
Filed June 1, 1955 2 Sheets-Sheet 2

ARCHIE C. WILSON
*INVENTOR.*

BY Halof McCaghun
atty.

United States Patent Office 2,836,463
Patented May 27, 1958

2,836,463

PROCESS FOR AIRCRAFT SPRAYING AND APPARATUS THEREFOR

Archie C. Wilson, West Palm Beach, Fla.

Application June 1, 1955, Serial No. 512,465

5 Claims. (Cl. 299—30)

This invention relates to process for aircraft spraying and apparatus therefor; more particularly the invention is directed to apparatus for effecting hollow cone dispersion from aircraft in motion to overcome the compressive force of air.

Heretofore aircraft have been employed in spraying and dusting, and in most of the spraying operations approximately twenty-five to thirty hollow cone nozzles have been deployed laterally across the aircraft wing because the compressive force of the air on the hollow cone spray compressed the spray angle and reduced to approximately one-fourth the ground angle causing merging of the particles. This invention avoids merging of particles by effecting hollow cone spray in air, equivalent to ground or static conditions.

By the employement of the device of this invention two nozzles, placed one on each of the wing tips of an aircraft, form the nucleus of two cyclone generators. By the device of this invention, when an aircraft is in flight, a uniform dispersion of the hollow cone nozzle is increased to approximately 30 feet in diameter.

An object of this invention is to provide a method of aircraft spraying which will give a uniform dispersion of particle size and concentration.

Another object of this invention is to provide a device which will generate a cyclone when pased through air to effect a hollow cone air nozzle overcoming the compressive force of air.

Another object of this invention is to provide a device of the class described which will convert a static hollow cone nozzle into a hollow cone air nozzle.

A still further object of this invention is to provide a device of the class described which is simple and economical in construction and efficient and durable in use by the employment of a minimum number of parts but which may be fabricated by unskilled labor.

The foregoing and other objects and advantages of this invention will be more apparent from reading the following specifications, in conjunction with the drawings forming a part thereof, wherein;

Fig. 1 is a perspective view of the device of this invention fastened to a stub airfoil which may be secured to the wing tips of an aircraft;

Fig. 2 is a perspective view of the hollow cone member to which vanes are secured showing the line of attachment of the vanes;

Fig. 3 is a perspective view of the cone of Fig. 2 with one vane secured thereto;

Fig. 4 is a perspective view of the cone of Fig. 2 with all vanes fastened thereto;

Fig. 5 is a perspective view of Fig. 4 with a housing positioned around the vanes and secured thereto;

Figure 6:
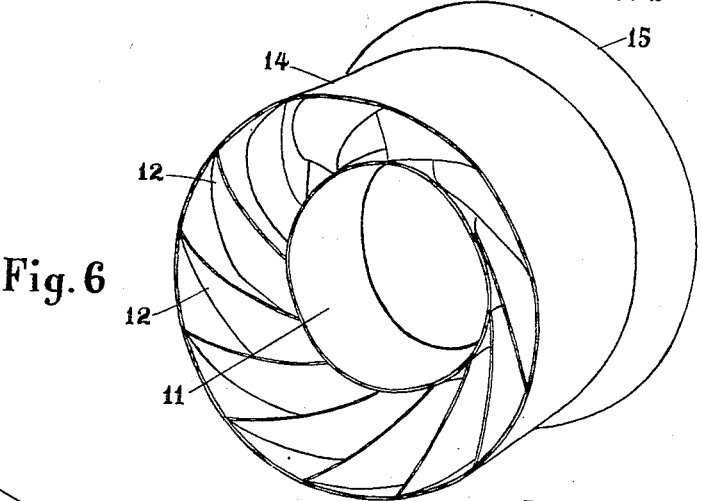
Fig. 6 is a perspective view of the cyclone booster shown in Fig. 1.
Figure 7:
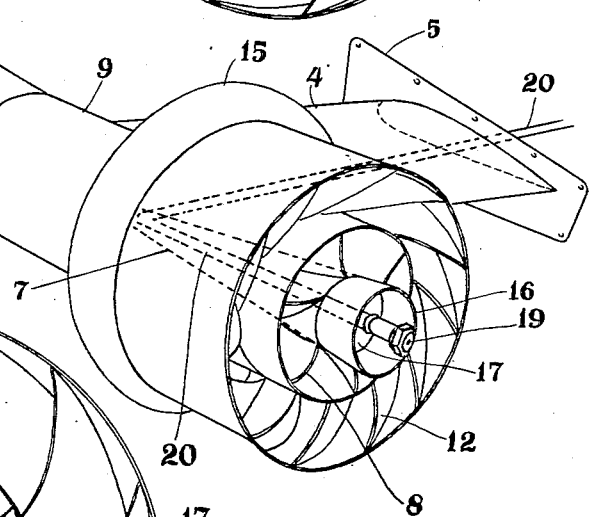
Fig. 7 is a perspective view of the device of Fig. 1 as viewed or perspected from the face thereof.
Figure 8:
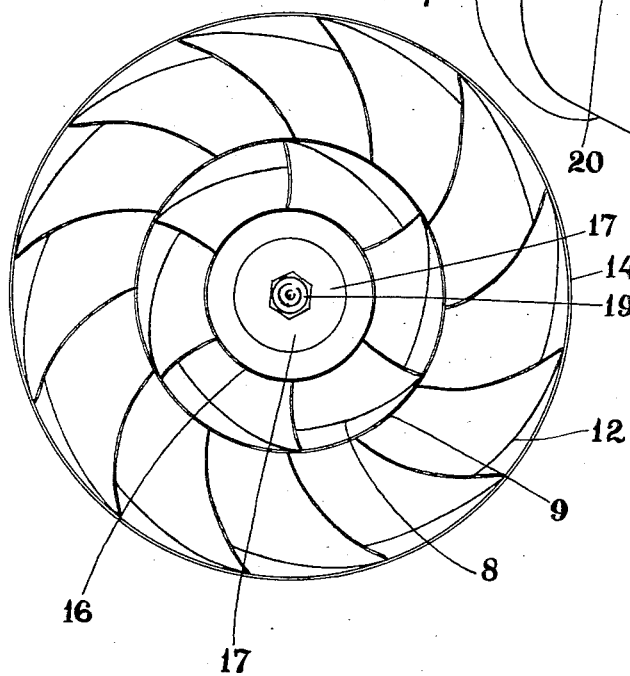
Fig. 8 is a plan view of the face of the device of this invention showing the vanes in opposite rotation from the other view and as applied to the opposite wing tip from the other view.

Referring to the drawings, wherein like members are given the same reference numerals, in Fig. 1 the device is indicated generally wherein a hollow frustro-conical air scoop 1, is secured to a cyclone generator 2, having a cyclone booster 3, fitted there around and removably secured thereto. The cyclone generator 2, is secured to a stub airfoil 4, terminating in a plate 5, which may be secured to the tip of an aircraft wing.

The cyclone generator 2, is formed of a hollow conical member 7, having vanes 8, secured thereto with the points of attachment of the ends of said vanes to the top and bottom of said cone being spaced, preferably at 120° apart, with the angle of twist being slightly graduated for approximately two-thirds of the length from the narrow end of the cone and rapidly increasing in the remaining one-third length of the cone and vane. The vanes 8, are enclosed in a cylindrical housing 9, to provide helical conduits defined by the cone 7, housing 9 and multiple vanes.

The cyclone booster 3 comprises a cylindrical member 11 to which vanes 12 are angularly positioned similarly to vanes 8 of the cyclone generator 2 but with a higher angle of twist, and twisting in the same direction as said vanes 8. The housing 14 is provided around the vanes 12 and secured thereto to define helical air paths or conduits between the vanes 12 in conjunction with the housing 14 and the cylindrical member 11. The housing 14 may be provided with a flange 15 to function as an air scoop for this cyclone booster 3.

The static hollow cone nozzle 19 should be at a much reduced pressure from the cyclone generator 2 and booster 3 and, to effect this, a hollow tapering shroud 16, having a hermetically sealed bottom 17 is secured to the large end of the hollow cone member 7. Thus, when moving through air the generator creates a cyclonic action effecting a partial vacuum in the shroud 16. The hollow tapered shroud 16, preferably has the same angle of taper as the hollow cone member 7. A standard conventional hollow cone nozzle 19 is mounted along the longitional axis of said shroud 16 and connected with a pipe 20, extending substantially along the longitudinal aixs of the conical member 7, unto a point conveniently located with respect to the stub airfoil 4, to extend from said conical member 7 through the stub airfoil 4 and connect with a conduit from a pressure pump conveniently located on the aircraft.

As previously stated there are two of these devices, one mounted on each wing tip of the aircraft. The devices are the same except that one has a right turned or clockwise vane and the other has a left turned or counter-clockwise vane, as will be explained hereafter. The device mounted on the left wing tip has clockwise twisted vanes whereas the device on the right wing tip has counter-clockwise vanes.

In operation the device functions to create a cyclone or tornado to overcome the compressive force of the air on the hollow cone spray emanating from the nozzle 19, when the aircraft is in motion. To accomplish this the cyclone generator 2, when an aircraft is moving through the air creates a swirling circular motion of air at high velocity which picks up the hollow conical spray emanating from the nozzle 19, which spray is at a much reduced pressure from the generated cyclone emanating from the cyclone generator 2. This normally would create sufficient cyclonic action wiith respect to the vortex of the generated cyclone, except that the slipstream of the plane, the compressive force of the air and the conjunction of the displaced air by the wings tend to compress and dissipate the generated cyclone. Accordingly, the cyclone booster 3 is positioned around the cyclone generator 2 to increase the strength of the cyclone.

Additional boosters may be positioned around this booster 3 if desired and particularly if extremely long wing aircraft are employed. When the desired position of the booster 3, with respect to the generator 2 is obtained, the booster 3 is fixed thereto in any conveniently conventional manner such as nut and bolt assembly, spot welding and the like. Other connections of the members herein described are usually and preferably weld or solder connections as they are permanent connections.

The operation with respect to the spraying condition and the method of spraying will be described herein with respect to aircraft of the size normally employed in such operations, to-wit: aircraft having a wing span of 30 to 32 feet and a length of approximately 32 feet. With the device above described secured to the wing tips of the plane, and connected with a pump in the craft, which is cruising at approximately ninety miles per hour, the hollow conical nozzle emanates a spray, which the cyclone generator 2 and booster 3 extends to have a diameter of approximately 30 feet at a distance of approximately 100 feet behind the plane. This dispersion is much reduced in particle size and concentration over the prior art practices and is of the desired size and concentration.

The invention has been described in detail as applied to aircraft but it is clearly understood that the invention is not so limited but may also be used with other moving vehicles, or static vehicles with air blowers connected to the intakes of the generator and booster; and, many changes and modifications can be made therein without departing from the spirit and scope of the invention as defined in the appended claims.

Having thus described the invention, what is claimed is:

1. An air craft spraying device comprising a hollow cone nozzle incased in a hollow shroud having an hermetically sealed bottom, a cyclone generator surrounding said shroud and secured thereto, and comprising a plurality of helical conduits of decreasing longitudinal cross-section towards intake of said conduits, and said conduits creating a circular motion at high velocity to air emanating therefrom when moved through the air.

2. An air craft spraying device comprising a hollow cone nozzle incased in a tapering hollow shroud having an hermetically sealed bottom, a cyclone generator surrounding said shroud and secured thereto, and comprising a plurality of equiangular tapering helical conduits creating high velocity circular motion of air when moved through air, and a cyclone booster surrounding said generator and fastened thereto and comprising a plurality of similar helical conduits.

3. An air craft spraying device comprising a hollow cone nozzle incased in a tapering hollow shroud having an hermetically sealed bottom, a cyclone generator surrounding said shroud and secured thereto, and comprising a plurality of equal radial tapering helical conduits creating high velocity circular motion in air through which passed, a cyclone booster concentric with and surrounding and secured to said generator comprising similar helical conduits, and tapering hollow scoop secured to said generator and communicating with the intake side of said cyclone generator.

4. The device of claim 3 in which said cyclone booster is provided with an air scoop intake.

5. The device of claim 3 in which said generator comprises a tapering conical member, vanes longitudinally secured to said conical member in a substantially 120° rotation, and a cylindrical housing secured to said vanes.

References Cited in the file of this patent

UNITED STATES PATENTS

| | | |
|---|---|---|
| 2,537,251 | Wilson | Jan. 9, 1951 |
| 2,538,879 | Newcomb et al. | Jan. 23, 1951 |
| 2,547,927 | Daugherty | Apr. 10, 1951 |
| 2,651,178 | Williams | Sept. 8, 1953 |
| 2,730,402 | Whiting et al. | Jan. 10, 1956 |

FOREIGN PATENTS

| | | |
|---|---|---|
| 162,909 | Australia | Feb. 19, 1953 |